United States Patent
Conner et al.

(10) Patent No.: US 7,389,164 B1
(45) Date of Patent: Jun. 17, 2008

(54) SYSTEMS AND METHODS FOR AUTOMATIC DETECTION OF QFE OPERATIONS

(75) Inventors: Kevin J Conner, Kent, WA (US);
Steve C. Johnson, Issaquah, WA (US);
Yasuo Ishihara, Kirkland, WA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 11/625,714

(22) Filed: Jan. 22, 2007

(51) Int. Cl.
*G01C 5/00* (2006.01)
(52) U.S. Cl. ............................. 701/9; 701/14
(58) Field of Classification Search ............ 701/4, 701/1, 213, 214, 216, 224, 9; 342/462; 244/76 R
See application file for complete search history.

(56) References Cited

U.S. PATENT DOCUMENTS 6,216,064 B1 * 4/2001 Johnson et al. ............... 701/4
6,219,592 B1 * 4/2001 Muller et al. ................. 701/9
6,606,034 B1 * 8/2003 Muller et al. ............... 340/970
6,710,723 B2 * 3/2004 Muller et al. ............... 340/970

\* cited by examiner

*Primary Examiner*—Richard M. Camby
(74) *Attorney, Agent, or Firm*—Black Lowe & Graham PLLC

(57) ABSTRACT

Systems and methods for determining if an aircraft is approaching a atmospheric pressure at field elevation (QFE) airport and for alerting if any errors that might affect the production of an accurate altitude value. In an example method a global positioning system (GPS) altitude value is compared to a corrected barometric altitude, if an airport that the aircraft is proximate to (approaching) is a QFE airport. The field elevation of the proximate airport is added to the corrected barometric altitude to generate an adjusted barometric altitude, if the comparison between the GPS altitude and the corrected barometric altitude is greater than a predefined threshold. The adjusted barometric altitude is sent to relevant aircraft systems, such as an Enhanced Ground Proximity Warning System.

13 Claims, 3 Drawing Sheets

SYSTEMS AND METHODS FOR AUTOMATIC DETECTION OF QFE OPERATIONS

BACKGROUND OF THE INVENTION

Some airports around the world still operate under the practice of atmospheric pressure at field elevation (QFE). At QFE airports, Automatic Terminal Information Service (ATIS) or a similar outputted system outputs a barometric pressure setting value. This value is one that when an aircraft is positioned on the ground at the airport the barometric altimeter reading in the aircraft will read zero regardless of the altitude of the airport. Therefore, as shown in FIG. 1, if an aircraft is flying to a QFE airport that is at the elevation of 1000 feet, the barometric altimeter indicates that the aircraft is 1000 feet lower than it actually is. This does not become a problem if the aircrew informs all systems within the aircraft that use barometric pressure that it is based on a QFE setting. However, if the aircrew fails to make sure the other aircraft systems understand that the barometric altimeter is based on QFE operation, then the other aircraft systems will produce false alerts. For example, as the aircraft is descending towards the airport, a Terrain Awareness System (TAWS) produces caution and warning alerts as the aircraft is on approach to the airport because the TAWS believes that the aircraft is 1000 feet closer than it actually is to the ground. Since the aircraft is actually flying 1000 feet higher, this alert is a nuisance alert. Because of the number of tasks performed on an approach to landing, the flight crew may be overloaded and not want to bother with figuring out the cause of the alert and thus just deactivate the TAWS. Deactivation of the TAWS leaves the aircraft vulnerable to controlled flight into terrain (CFIT).

Therefore, there exists a need to automatically detect the use of QFE operations to avoid nuisance alerts such as altitude monitor function alerts.

SUMMARY OF THE INVENTION

The present invention provides systems and methods for determining if an aircraft is approaching a QFE airport and for alerting if any errors that might affect the production of an accurate altitude value. In an example method a global positioning system (GPS) altitude value is compared to a corrected barometric altitude, if an airport that the aircraft is proximate to (approaching) is a QFE airport. The field elevation of the proximate airport is added to the corrected barometric altitude to generate an adjusted barometric altitude, if the comparison between the GPS altitude and the corrected barometric altitude is greater than a predefined threshold. The adjusted barometric altitude is sent to relevant aircraft systems, such as an Enhanced Ground Proximity Warning System.

In one aspect of the invention, it is determined if there exists an error in the adjusted barometric altitude based on a temperature error value, a GPS error value, terrain database error value, radio altitude error, or altimetry system error. If an error is determined to exist, an alert is outputted to the flight crew.

In another aspect of the invention, the adjusted barometric altitude is sent only if the determined error is not greater than the second predefined threshold.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
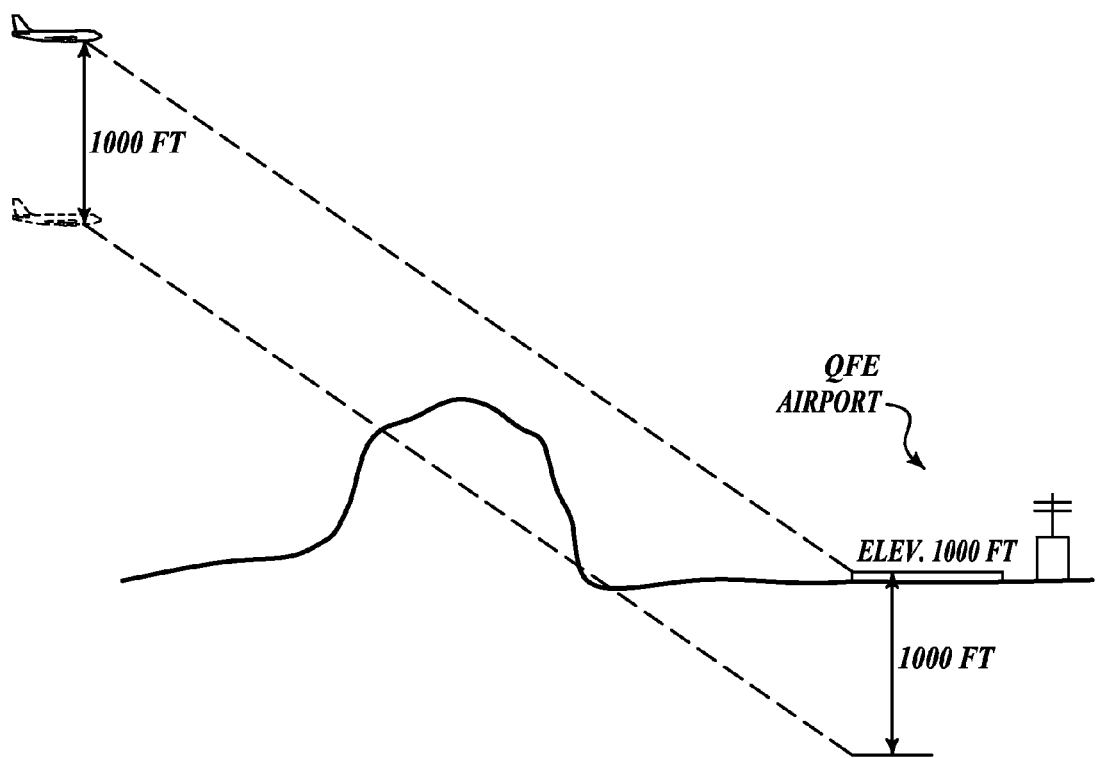
FIG. 1 illustrates a side view of an example approach to an airport in accordance with the prior art.
Figure 2:
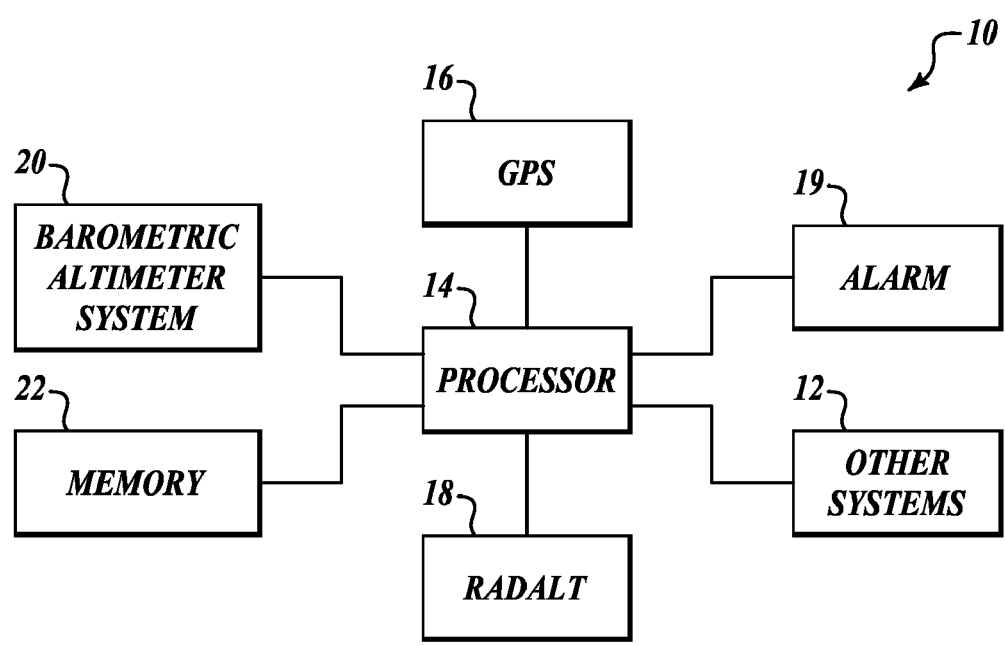
FIG. 2 illustrates a block diagram of an example system formed in accordance with the present invention.

FIG. 2 is a block diagram of an example system 10 for monitoring if an aircraft is approaching a QFE airport, applying appropriate corrections and alerting the flight crew if necessary. The system 10 includes a processor 14 that is in data and signal communication with other aircraft systems 12, a global positioning system (GPS) 16 or similar position determining system, a radio/radar altimeter (RADALT) 18, an alarm device 19, a barometric altimetry system 20, and memory 22.

The processor 14 includes a software application program that based on aircraft location information received from the GPS 16 or some other source and stored airport information in the memory 22 or a QFE signal from a transmitting airport ATIS signal, determines if the corrected barometric pressure indicates that the aircraft is performing a QFE operation. If the processor 14 determines that the aircraft is performing a QFE operation, then the barometric altimeter reading is adjusted accordingly (manually or automatically) and transmitted to any number of the aircraft systems 12 in order that they receive altitude information that is adjusted for the QFE barometric altimeter setting.

The processor 14 also determines if other variables are causing an error in adjusted barometric altimeter value. The barometric altimeter and analysis of the barometric altimeter can be affected by pitot-static system errors, GPS errors, temperature errors, or any of a number of different type of errors that might adversely effect the reception of an accurate barometric altimeter reading.

Figure 3:
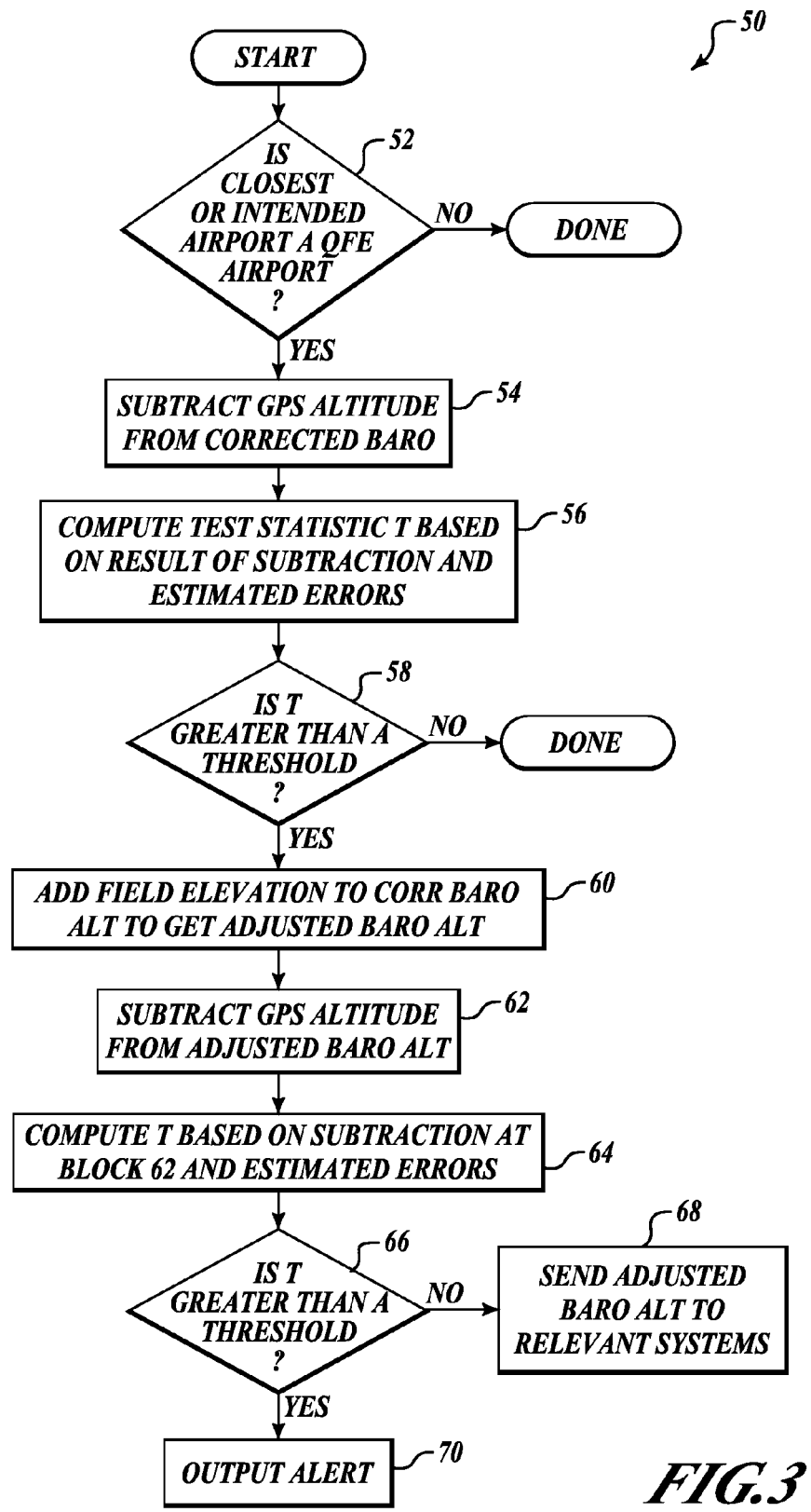
FIG. 3 illustrates an examples process performed by the system shown in FIG. 2.

FIG. 3 illustrates an example process 50 performed by the system 10 of FIG. 2. First at a decision block 52, the application program running on the processor 14 determines if a closest or intended airport is a QFE airport. The application program makes this determination in any of a number of different ways. For example, the application program includes a component that determines if the aircraft is on approach to a runway at a particular airport. The application program also determines closest or intended runway by receiving position information from the GPS 16 or one of the other aircraft systems 12, such as a flight management system (FMS) and compares the position information with airport information stored in the memory 22. An example of this function is described in more detail in co-owned U.S. Pat. No. 6,304,800, the contents of which are hereby incorporated by reference. In one embodiment, the memory 22 includes information about each airport that is stored within the memory 22 regarding whether the airport is Atmospheric Pressure at Nautical Height (QNH) airport or a QFE airport. Another method for determining if the closest or intended airport is a QFE airport is by data within the ATIS signal that indicates whether the airport is a QFE airport or a QNH airport.

If the closest or intended airport is not a QFE airport as determined at the decision block 52, the process 50 is complete and will repeat after a predefined delay. If at decision block 52 the closest or intended airport is determined to be a QFE airport, then at a block 54 a GPS altitude (or an altitude value received from some other source, such as FMS or the RADALT 18) is subtracted from a corrected barometric altimeter value. The corrected barometric altimeter value is the barometric altimeter value that is barometric altimeter value after the flight crew has corrected the barometric altimeter setting according to information included in the ATIS information. Next, at a block 56, a test statistic T (see Equation 1 below) is computed based on the result of the subtraction and estimated errors. At a decision block 58, the application program determines if T is greater than a threshold value. If at decision block 58 T is not greater than the threshold, then the process 50 continues as normal. If at the decision block 58 T is greater than the threshold amount, then, at a block 60, the application program retrieves the field elevation value for the closest or intended runway from either the memory 22 or from some other source, such as might be included in the ATIS signal, and adds the retrieved field elevation value to the corrected barometric altimeter value to produce an adjusted barometric altimeter value. Next, at block 62, the GPS altitude is subtracted from the adjusted barometric altimeter. At block 64, T is computed based on the result of the subtraction at block 62 and the estimated errors. Because various other parameters may affect the value of the barometric altimeter reading, the decision at decision block 66 is performed. At decision block 66, the application program determines if T computed at block 64 is greater than a threshold value. This determines if any other errors that adversely affect the barometric altimeter value exist. The types of errors that are analyzed for are described in more detail below. If no significant errors exist, as determined at the decision block 66, then, at a block 68, the adjusted barometric altimeter value is sent to any relevant systems (the other systems 12). For example, the adjusted barometric altimeter value is sent to a Terrain Awareness System (TAWS). The TAWS then uses the adjusted barometric altimeter value along with other position and aircraft parameter information to perform a terrain awareness operation.

If at the decision block 66 T is greater than a threshold (there does exist one or more errors), then, at block 70, the processor 14 outputs an alert via the alarm device 19, which is configured to generate an audio and/or visual alarm.

A test statistic T is defined as follows:

$$T = \frac{1}{\sigma^2} \sum_{i=1}^{n} d(i)^2 \quad (1)$$

d—difference between GPS altitude and corrected barometric altitude or adjusted barometric altitude.

The test statistic is a function of the actual measured error, d(i), as well as the assumed (estimated) errors σ (which are defined below), in corrected barometric altitude and GPS altitude. The test statistic is then averaged over many samples to help reduce high frequency noise, for example 25 samples.

The Equation 1 has a chi-square distribution with n=25 degrees of freedom (DOF). Therefore the monitor's error threshold can be developed depending on the desired alarm rate under normal (no failure) conditions (Pa) using a chi-squared distribution table. For a Pa of 0.99999 ($10^{-5}$) and n=25 DOF, the threshold is found to be 67.

Anytime the test statistic T is greater than 67 then an alarm would be issued. An additional time guard could be added to prevent momentary excursions above the threshold from tripping the monitor. The setting of the alarm threshold then must be made such that it minimizes the number of nuisance or false alarms, yet is sensitive enough to detect real setting errors.

To determine the actual error value that can be detected, the test threshold value TH can be substituted for T and solved for the error value which gives the equation below:

$$\text{Error(feet)} = \sqrt{\frac{TH * \sigma^2}{n}} \quad (2)$$

This can be further simplified since the test threshold and the number of samples will be fixed. The equation can be re-written as follows:

$$\text{Error(feet)} = \sqrt{\frac{TH}{n}} * \sigma \quad (3)$$

Therefore, the error value is a function of the test threshold, the assumed error value and the number of samples. For a threshold value of 67 and 25 samples this reduces to:

$$\text{Error(feet)} = 1.64 * \sigma \quad (4)$$

This error value can be used as a type of vertical integrity value since it represents the size of the vertical error that is protected at the assumed probability level ($10^{-5}$).

To minimize false alerts the monitoring function needs to only be run when there is a high confidence in the signals being used. For example:

1. GPS Monitoring:
   a) GPS Altitude and Vertical Figure of Merit (VFOM) valid (includes reasonableness checks);
   b) GPS not in altitude aiding mode;
   c) GPS number of satellites tracked 5 or greater;
   d) GPS Receiver Autonomous Integrity Monitoring (RAIM) flag not True (Non-Isolatable Satellite Failure (NISF) bit #11 of Horizontal Integrity Limit (HIL) label);
   e) GPS HIL and/or Vertical Integrity Limit (VIL) valid; and
   f) GPS VFOM<750 feet.
2. Corrected Barometric Altitude, Pressure Altitude, Static Air Temperature (SAT) valid;
3. Enhanced Ground Proximity Warning System (EG-PWS) runway database Valid;
4. Pressure Altitude less than Transition Altitude from EGPWS runway database for more than 30 seconds OR Height above Field less than 1500 feet;
5. Height above Field less than 5000 feet;
6. Aircraft within 20 nautical miles of runway;
7. Airport not a QFE airport, OR altimeter setting not in QFE.

The following sections quantify the normal expected errors in both Corrected Barometric Altitude as well as the GPS Altitude.

The following errors are assumed in the Corrected Barometric Altitude from an Air Data Computer (ADC) that may be included in the barometric altimetry system 20.

1. Non-standard temperature induced error (ISAD);
2. Altimetry System error (ASE);
3. Altimeter Setting error;
4. Pressure gradient error;
5. Sampling errors;
6. Other non-modeled errors.

ISAD is typically the largest error component on barometric altitude. The magnitude of the error is a function of the temperature deviation from a standard day (ISA) and the height above the reporting station.

The magnitude of the error ranges from 0 on an ISA day to 486 feet on an ISA +/−30 degree day at 5000 feet above the reporting station. The standard equation adopted by International Civil Aviation Organization (ICAO) for calculating error is:

$$ISAD \equiv \frac{\Delta h \cdot \Delta ISA}{T0 + \Delta ISA - 0.5 \cdot (h + \Delta h) \cdot \lambda} \qquad (5)$$

Where:
ISAD is the amount of error in feet;
h is the MSL elevation of the reporting station (runway) in feet;
$\Delta h$ is the height above the reporting station (runway) in feet;
$\Delta ISA$ is the temperature difference from standard of the reporting station (runway) in deg.;
T0 is standard day sea level temperature in degrees Kelvin (288.15);
$\lambda$ is the standard temperature lapse rate in degrees C. per foot (0.00198).

The measured SAT on the aircraft obtained from the ADC is used to estimate the reporting station temperature. This would assume that the reporting station is at the nearest runway elevation retrieved from the memory 22 or memory associated with the TAWS/EGPWS.

ASE accounts for the residual errors in the altitude measurement system. The ASE equation is provided by Boeing and is based on flight test data and is a 3 sigma value. The magnitude of the error is a function of aircraft altitude and ranges from 50 feet at sea-level to 170 feet at 41,000 feet.

$$ASE = k1 \bullet (h + \Delta h)^2 + k2 \bullet (h + \Delta h) + k3 \qquad (6)$$

Where:
ASE is the amount of error in feet
$k1 = -8.8 * 10^{-8}$;
$k2 = 6.5 * 10^{-3}$;
$k3 = 50$;
h is the MSL elevation of the reporting station (runway) in feet; and
$\Delta h$ is the height above the reporting station (runway) in feet Altimeter setting error component is open to human error. The ATIS error has been set at 20 feet (3 sigma). The pilot enters the correction. Because a human enters it, this error can be random and unpredictable. This human error is the main error component that the monitor tries to detect.

When aircraft is away from the pressure setting location, errors may develop due to large pressure gradients. Past analysis from various sources has put this error value at 5 feet per nautical mile.

GPS Altitude and Corrected Barometric Altitude both come into the EGPWS at different rates. For high descent rates this lag can cause differences between the two altitudes. To account for this a sample rate error based on vertical speed is computed as shown:

$$SPE = IVS * Ksp \qquad (7)$$

Where:
SPE—Sample Error;
IVS is vertical speed in feet per second; and
Ksp is 1 second (current estimated lag).

There are numerous other error sources that can also occur and cannot easily be quantified. Some of them are listed below.

1. Temperature inversions and non-standard temperature lapse rate conditions. The ICAO temperature correction assumes a standard day lapse rate in temperature. During temperature inversions this assumption is not true; this will result in inaccurate error calculations for the temperature deviation. This is discussed in more detail below.
2. Mountainous Terrain. The combination of strong winds and mountainous terrain can cause local changes in atmospheric pressure due to the Bernoulli Effect. This occurs particularly when the wind direction is across mountain crests or ridges.

As defined above the largest error in Corrected Barometric Altitude is the effect of temperature. While this error can be modeled as detailed above the result is that for large non-standard day conditions the resultant error is so large that it significantly reduces the ability to detect a mis-set altimeter condition or other type error. Therefore, it is desirable to reduce this error. To do this the ISAD can be used to "temperature correct" the Corrected Barometric Altitude before it is compared to GPS altitude. Unfortunately it has been shown in the report titled "*Analysis of Various Temperature Correction Algorithms Using Radio-Sonde Data*," written by Honeywell, that the temperature correction formula is only about 60% effective in reducing error. This is mainly due to non-standard temperature lapse rates due to temperature inversions close to the ground. Therefore, the assumed error used in the monitoring algorithm should still assume about a 40% error due to the ISAD component above even after temperature correcting the data.

The 2 sigma no fault estimated accuracy of GPS altitude is provided by the Vertical Figure of Merit (VFOM) value. Note that this estimate does not include errors in converting from the WGS-84 ellipsoid height to MSL. This conversion is done using a Geoid look-up table and in most receivers is very crude and based on outdated values. The 1 sigma error value on this conversion is estimated to be 10 feet. Therefore, the overall error in GPS altitude at a 2 sigma value is as follows:

$$GPS\_ERROR = GPS\_VFOM + 2 * GEOID\_ERROR \qquad (8)$$

As noted above the check is run when the GPS receiver is able to run its integrity checking algorithm as indicated by the HIL and VIL validities. This helps to ensure that erroneous GPS values do not cause false alerts.

The overall assumed error sigma is defined as follows (actual max of the 25 last samples):

$$\sigma = k * ISAD + \sqrt{ASE^2 + ATIS^2 + GPS\_ERROR^2 + PGE^2 + SPE^2} \qquad (9)$$

The k factor in the above equation that is applied to the ISAD value is the assumed effectiveness of the ISAD equation in correcting for the actual error due to temperature. This would be set to a 1.0 if temperature correcting is not done before running the monitor. If temperature correcting is done, the value is currently set to 0.4.

PGE is Pressure Gradient Error, which in one embodiment is 5 feet/nautical mile from runway.

Another independent altitude source which can be used to monitor errors in Corrected Barometric Altitude is Radio Altitude. When Radio Altitude is added to the EGPWS terrain database value it forms an independent indication of the aircrafts Geometric Altitude. This can be used as an additional crosscheck to minimize false alerts in the monitor. Much of the work of deriving the altitude from the radio height and the terrain database is taken from the Geometric Altitude algorithm.

The radio altitude value comes in at a much higher sample rate when compared to the aircraft's speed across the terrain database cells. Therefore, the radio altitude value is averaged. As was done for Geometric Altitude the minimum radio height value in a 20 sample window is used. Twenty samples work out to be 1 second.

The terrain database value used is the average of the 9 terrain cells under the aircraft. This gives a good overall representation of the terrain seen to be the radio altimeter.

The derived altitude is then:

$$HR\_DB = HR\_avg + 9 \text{ Cell average} \quad (10)$$

HR—height radio (or radio altitude)

Again, because of the coarse horizontal and vertical resolution of the current EGPWS terrain database this derived altitude can be quite noisy. The Geometric Altitude algorithm does not use the pressure altitude in this embodiment. Because a 25 sample average is used to reduce this noise and filtering may not be necessary. If additional filtering is needed, Vertical Acceleration is used when available in a complementary filter to damp out the noise.

Then the derived altitude is compared to the Corrected Barometric Altitude as was done with GPS Altitude or the derived altitude is used to crosscheck the GPS Altitude.

Different Radio Altimeters have different altitude tracking limits. At a minimum, the Radio Altimeters should all track to at least 2500 feet above the ground. Some will track to the ARINC maximum of 8192 feet. Therefore, the radio altitude monitor function will have to account for the tracking value of the altimeter.

The estimated error in Radio Altitude is given below:
For Radio Altitude<500 feet:

$$HR\_error = 10 + 0.03 * HR \quad (11)$$

For Radio Altitude>500 feet:

$$HR\_error = 10 + 0.05 * HR \quad (12)$$

The 10 foot value is to account for installation errors and could be reduced if an auto-calibration scheme is implemented to remove this offset error.

The error in the Terrain database is a function of the source data for a given area as well as the EGPWS vertical and horizontal resolution. Only terrain that is considered high quality will be used by the EGPWS. In most cases, the accuracy of this data should be within 30 feet at a 1 sigma value. The resolution of the EGPWS terrain database is only 100 feet currently in most versions. For data beyond 5 miles of an airport the value is rounded up to the nearest 100 foot value. For data within 5 miles of the airport the data is rounded to the nearest 100 foot value.

An additional error factor needs to be considered due to the horizontal resolution of the terrain database. Currently the horizontal resolution is 15 arc-seconds or ~0.25 nautical miles. Therefore, during flight in valleys the true terrain elevation under the aircraft may be significantly lower than what the terrain database indicates. To help account for this the flatness of the terrain is taken into account by looking at the 9 terrain cells around the current aircraft altitude and computing the standard deviation of the 9 cells. This standard deviation can be used to increase the error estimate when needed.

The Terrain database error estimate is as follows:

$$DB\_error = 150 + 9 \text{ cell standard deviation} \quad (13)$$

When both the GPS altitude and the Radio altitude based monitors are available there are two choices on implementing the monitor. If the radio altitude based value is compared to Corrected Barometric Altitude then both monitors trip before annunciating an alert. The downside to this is that because of the larger assumed errors in the Radio altitude based monitor, the size of the error that can be detected by both monitors is much larger.

Therefore, as it is currently implemented the Radio altitude based monitor is used to crosscheck the GPS altitude instead of the Corrected Barometric Altitude. As long as this monitor does not trip, then alerts will be annunciated if the GPS monitor detects an error in the Corrected Barometric Altitude. The Radio Altitude based monitor is then used to detect large errors in GPS altitude. Above the tracking range of the RADALT then a cross monitor is not available, therefore, the threshold on the GPS monitor could be raised to give a lower false alarm rate or the GPS VIL value could be used in place of GPS VFOM as the estimated accuracy of the GPS Altitude value.

The assumed overall error sigma using radio altitude to monitor the GPS Altitude is defined as follows (actual max of the 25 last samples):

$$\sigma = \sqrt{DB\_error^2 + Hr\_error^2 + GPS\_ERROR^2 + SPE^2} \quad (14)$$

While the preferred embodiment of the invention has been illustrated and described, as noted above, many changes can be made without departing from the spirit and scope of the invention. For example, other sampling values may be used. Accordingly, the scope of the invention is not limited by the disclosure of the preferred embodiment. Instead, the invention should be determined entirely by reference to the claims that follow.

The invention claimed is:

1. A method performed within an aircraft comprising:
   comparing a global positioning system (GPS) altitude value to a corrected barometric altitude, if an airport proximate to the aircraft is a QFE airport;
   adding a field elevation of the proximate QFE airport to the corrected barometric altitude to generate an adjusted barometric altitude, if the comparison between the GPS altitude and the corrected barometric altitude is greater than a first predefined threshold;
   determining if an error exists in the adjusted barometric altitude based on at least one of a temperature error value and a GPS error value; and
   sending the adjusted barometric altitude to relevant aircraft systems, if the determined error is not greater than a second predefined threshold.

2. The method of claim 1, wherein the relevant aircraft systems include a terrain awareness system.

3. The method of claim 1, further comprising:
   outputting an alert if an error is determined to exist.

4. The method of claim 1, wherein determining if there exists an error in the adjusted barometric altitude is further based on a terrain database error value.

5. The method of claim 1, wherein determining if there exists an error in the adjusted barometric altitude is further based on a radio altitude error.

6. The method of claim 1, wherein determining if there exists an error in the adjusted barometric altitude is further based on an altimetry system error.

7. A position determinig system located on an aircraft, the system comprising:
- a global positioning system (GPS) altimetry system for determining a GPS altitude of the aircraft;
- a barometric altimetry system for generating barometric altitude and corrected barometric altitude;
- a processor in data communication with the position determining system, the processor comprising:
  - logic for determining if an airport proximate to the aircraft is a QFE airport;
  - logic for comparing the GPS altitude value to the corrected barometric altitude, if the proximate airport is determined to be a QFE airport;
  - logic for adding a field elevation of the proximate airport to the corrected barometric altitude to generate an adjusted barometric altitude, if the comparison between the GPS altitude and the corrected barometric altitude is greater than a first predefined threshold; and
  - logic for sending the adjusted barometric altitude to relevant aircraft systems, the sending logic being operable to communicate the adjusted barometric altitude, if the determined error is not greater than a second predefined threshold.

8. The system of claim 7, wherein the relevant aircraft systems include a terrain awareness system.

9. The system of claim 7, wherein the processor further comprises:
- a component for determining if there exists an error in the adjusted barometric altitude based on at least one of a temperature error value or a GPS error value.

10. The system of claim 9, further comprising:
- a device for outputting an alert if the processor determines that an error exists.

11. The system of claim 9, wherein the component for determining determines if there exists an error in the adjusted barometric altitude based on a terrain database error value.

12. The system of claim 9, wherein the component for determining determines if there exists an error in the adjusted barometric altitude based on a radio altitude error.

13. The system of claim 9, wherein the component for determining determines if there exists an error in the adjusted barometric altitude based on an altimetry system error.

* * * * *